United States Patent

Braswell-Moore

Patent Number: 5,123,115
Date of Patent: Jun. 23, 1992

[54] SURGEON'S HEADPIECE

[76] Inventor: Glenda M. Braswell-Moore, 405 Maiden La., Chesapeake, Va. 23325

[21] Appl. No.: 677,530

[22] Filed: Mar. 29, 1991

[51] Int. Cl.⁵ .......................... A42B 1/24; G02C 3/00
[52] U.S. Cl. ............................................. 2/10; 2/199; 2/DIG. 6; 351/155
[58] Field of Search .......... 2/199, DIG. 6, 10, 185 R, 2/202, 205, 422, 13; 351/155, 156; 128/201.12

[56] References Cited

U.S. PATENT DOCUMENTS

| | | | |
|---|---|---|---|
| 349,018 | 9/1886 | Waddell | 351/155 |
| 779,591 | 1/1905 | Fairbanks | 2/10 |
| 1,334,878 | 3/1920 | Young | 351/155 |
| 1,693,505 | 11/1928 | Fisher | 2/10 |
| 1,695,596 | 12/1928 | Levinsky | 2/10 |
| 4,179,753 | 12/1979 | Aronberg et al. | 2/199 |
| 4,312,338 | 1/1982 | Glassman | 128/201.12 |
| 4,387,471 | 6/1983 | Hsu et al. | 2/10 |
| 4,464,797 | 8/1984 | Glassman | 2/199 |
| 4,636,048 | 1/1987 | Jones | 351/155 |
| 4,657,364 | 4/1987 | Murrell | 351/156 |
| 4,781,451 | 11/1988 | McAllen | 351/155 |
| 4,800,594 | 1/1989 | Young | 2/DIG. 6 |

FOREIGN PATENT DOCUMENTS 1319413  1/1963 France ........................ 351/155

*Primary Examiner*—Werner H. Schroeder
*Assistant Examiner*—Amy Brooke Vanatta
*Attorney, Agent, or Firm*—Branigan & Butler Griffin

[57] ABSTRACT

A surgeon's headpiece (10) comprises a cap (12) having an elongated, flexible, eyeglass retainer member (14) attached at an interior surface (24) of a front portion (18) thereof with an outer, distal, end portion (32) for looping about a nose bridge (52) of eyeglasses (50) and doubling back on itself and being fastened to itself. The cap is slit at the front portion with the eyeglass retainer member being attached to the cap on opposite sides of the slit (20) in the interior of the cap so that a top surface (34) of the eyeglass retainer is exposed at an exterior (36) of the cap, with the distal end portion of the eyeglass retainer being brought into contact with, and fastened to, the top surface exposed through the slit. A proximal end portion (30) of the eyeglass retainer member has a greater width than the distal end portion. A base member (40) is constructed primarily of soft foam covered by soft loop fastener material and has a piece of hook fastener material attached to an outer end portion thereof to form the eyeglass retainer member.

12 Claims, 1 Drawing Sheet

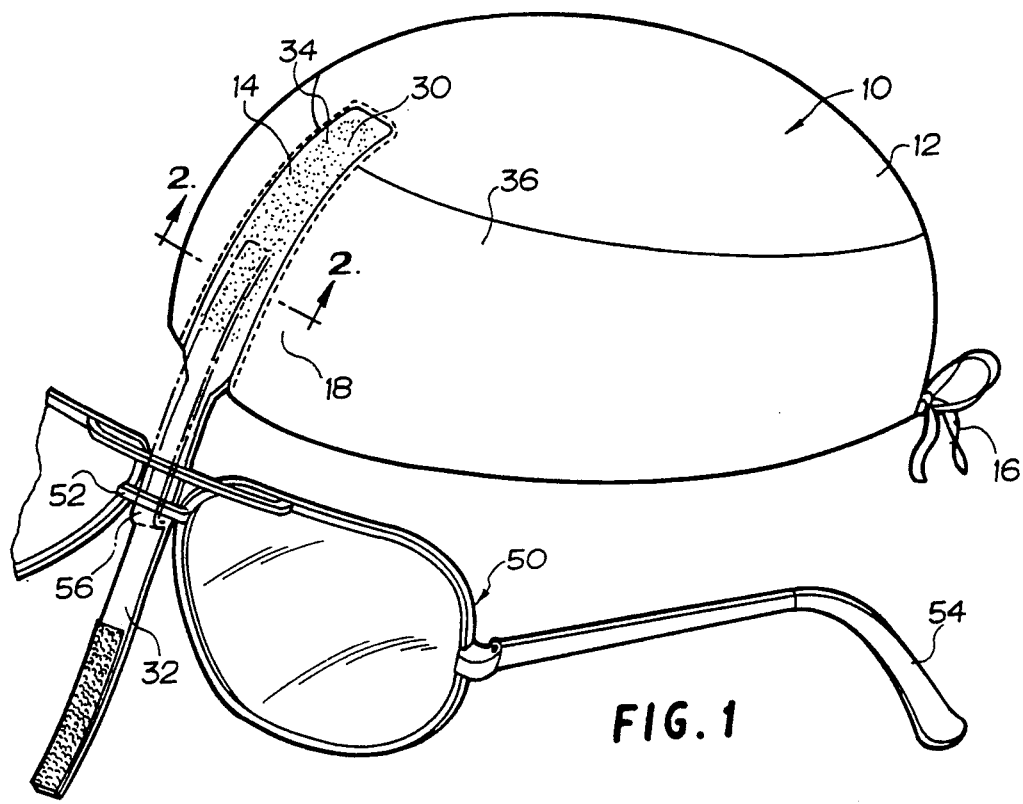
FIG. 1
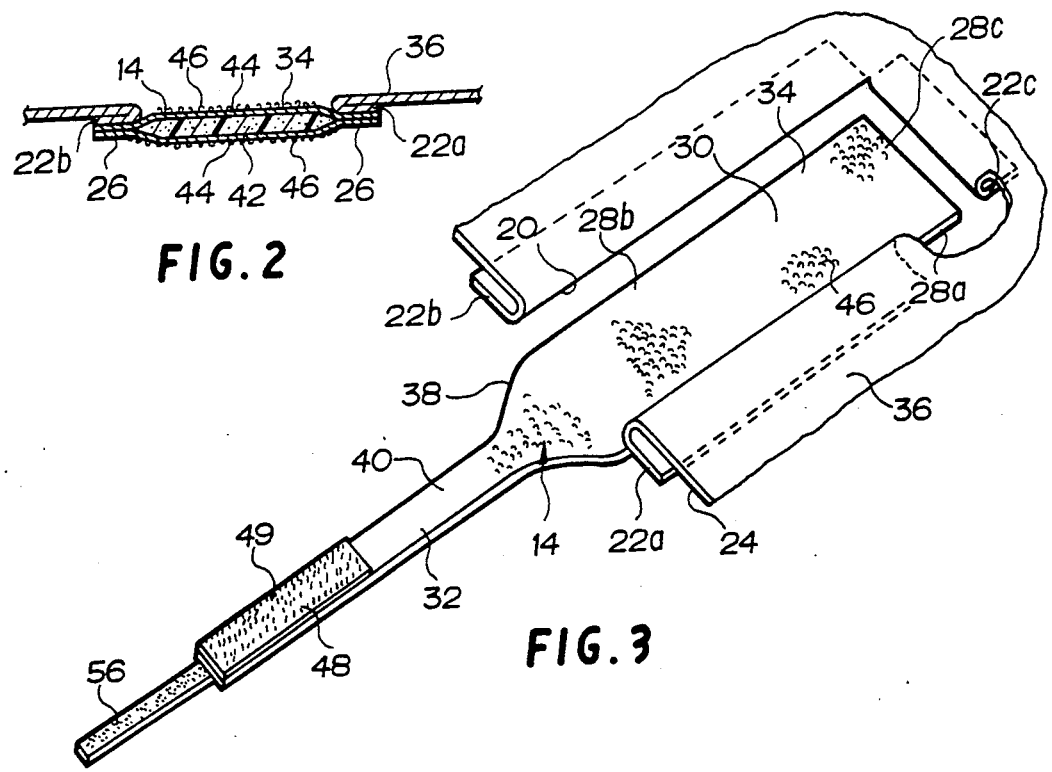
FIG. 2
FIG. 3

1

SURGEON'S HEADPIECE

BACKGROUND OF THE INVENTION

This invention relates generally to equipment for surgeons and more specifically to apparatus for retaining eyeglasses or safety glasses in place during intricate procedures by surgeons.

Surgeons and other personnel who wear eyeglasses and/or safety glasses during procedures have the problem that their eyeglasses and/or safety glasses often fall from their faces, or slip toward ends of their noses, during sterile operative procedures. When this happens, it is usually difficult for these personnel to control their eyeglasses with their hands because their hands are busy, sterile and/or covered with body fluids (which may be contaminated). Quite often doctors must ask nurses to shove eyeglasses upwardly about their noses. Frequently, surgeons and their assistants secure their eyeglasses to their caps and/or foreheads with tape prior to an operation or procedure so that the eyeglasses will stay in place. However, such tape will often become moist due to perspiration and become ineffective during an operation, thereby creating all the problems mentioned above. Further, when tape becomes moist due to perspiration it and eyeglasses it is holding sometimes fall into a sterile surgical field.

It has been suggested in U.S. Pat. No. 4,387,471 to Hsu to retain eyeglasses on a surgeon by means of an elongated flexible tape-like member which attaches at an exterior of a surgeon's hood and has a hook/loop fastener (VELCRO) at an operative end thereof to extend about a bridge of eyeglasses.

Other devices for retaining eyeglasses on a surgeon's nose are described in U.S. Pat. Nos. 4,312,338 and 4,464,797 to Glassman. A difficulty with Hsu's device is that it is attached to an outer surface of the hood by means of an adhesive and such an adhesive can become moist and ineffective during an operation. Also, because the retainer is on the outside of the hood, a surgeon using it can easily, inadvertently, pull the retainer from the hood when trying to adjust it for his eyeglasses. Further, it is difficult to adjust the position of eyeglasses therewith because the surgeon cannot see the retainer and therefore must make such adjustments by feel. Not only does the surgeon have difficulty fastening the retainer about the eyeglass nose bridge but he has trouble unfastening it as well, often tearing the retainer from the hood.

Yet another difficultly with some retainers of the type disclosed by Hsu is that retainer material therefor, which is hook and loop fastener (VELCRO) material, is rather hard and can be irritating to skin so that noses or foreheads of surgeons and their assistants are irritated by use thereof.

Thus, it is an object of this invention to provide an eyeglass retainer for surgeons and other personnel which is easy to adjust to fasten about and unfasten from eyeglass nose bridges. It is also an object of this invention to provide such an eyeglass retainer which, when it is adjusted, is not easily thereby damaged.

It is also an object of this invention to provide an eyeglass retainer which is adaptable for all head sizes.

Further, it is an object of this invention to provide such an eyeglass retainer which remains securely attached to a surgeons head during use thereof.

Further, it is an object of this invention to provide an eyeglass retainer which absorbs moisture but yet maintains its integrity during intensive use.

Finally, it is an object of this invention to provide such an eyeglass retainer which is not substantially irritating to skin of a user.

SUMMARY OF THE INVENTION

According to principles of this invention, an eyeglass retainer is part of a surgeon's headpiece, being attached to an interior surface of a front portion of a cap on opposite sides of a cap slit so that a top side of the retainer is exposed through the slit to the exterior of the cap. An outer, distal, end portion of the retainer extends below the cap for wrapping about a nose bridge of eyeglasses and for being fastened to the top side of the eyeglass retainer at the slit. The eyeglass retainer member has a greater width at a proximal portion attached to the cap than at the outer-end distal portion extending below the cap. The eyeglass retainer member is constructed primarily of foam covered by a soft loop fastener material, with a piece of hook fastener material attached to the distal end portion.

BRIEF DESCRIPTION OF THE DRAWINGS

The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

FIG. 1 is an isometric view of a surgeon's headpiece including an eyeglass retainer member of this invention along with a pair of eyeglasses, the eyeglass retainer member being shown fastened about a nose bridge of the eyeglasses in phantom;

FIG. 2 is a segmented cross sectional view taken on line 2—2 in FIG. 1; and

FIG. 3 is a segmented, cutaway, isometric, exploded, view of a portion of the surgeon's headpiece of FIG. 1.

DESCRIPTION OF PREFERRED EMBODIMENTS

A surgeon's headpiece 10 comprises a cap 12 and an elongated, flexible, eyeglass retainer member 14.

The cap 12 is normally of a tough tissue-like material which can be relatively easily torn, is quite absorbent, and is quite porous for allowing passage of air therethrough. Many such caps 10 are slit in the back with tethers 16 attached at opposite sides of the slit to be tied together for adjusting the width of the slit, and thereby the cap, to fit a surgeon's head.

The eyeglass retainer member 14 is sewn to a front portion 18 of the cap 12 as is depicted in FIG. 1. In this respect, the cap 12 is cut, or slit at its front portion 18 to form a slit 20 (FIG. 3). Right, left, and rear edges 22a, 22b, and 22c, defining the slit 20 are doubled back toward an interior surface 24 of the cap 12 and sewn by stitches 26 (FIG. 2) to right, left, and end edge portions 28a, 28b and 28c (FIG. 3) of a proximal end portion 30 of the eyeglass retainer member 14. In this regard, a proximal end portion 30, which is sewn into the interior surface of the cap 12 has a substantially greater width than a distal, or outer-end, portion 32 of the eyeglass retainer member which extends below the cap 12. It can be seen in all three figures that when the eyeglass retainer member 14 is sewn into the interior of the cap 12, in the manner described, most of a top surface 34 of the wider proximal end portion 30 is exposed from an exterior surface 36 of the cap 12, however, the right, left and end edge portions 28a, b and c of the proximal end portion 30 are not exposed and cannot be gripped from the exterior of the cap 12.

The proximal end portion 30 of the eyeglass retainer member 14 is 1 ⅜ inches wide and 6 inches long while the distal end portion 32 is ⅜ inches wide and 6 inches long. The proximal and distal end portions 30 and 32 join one another at a Y-shaped tapered interface 38. In a preferred embodiment, a base member 40 of the eyeglass retainer member 14 is constructed of a soft foam plastic core 42 having layers of soft loop-fastener material 44 with fastening loops 46 extending outwardly therefrom.

A 1 ½ inch piece of hook fastener material 48 is attached approximately at a distal end of the distal end portion 32 so that its hooks face in the same direction as the exterior surface 36 of the cap 12 when the retainer member is extended in a linear configuration. This arrangement allows sufficient adjustability to provide a snug fit for wearers with smaller heads. The soft material 44, with fastening loops 46, and the hook fastener material 48, with hooks 49, can be of a type sold under the trademark VELCRO, however, other materials will work as well. It is, however, important that the material 44 and its fastening hooks 46 be soft so that when they impinge on human skin they will normally not irritate it. The hook fastener material 48 need not be so soft since it does not normally contact skin.

In operation, the proximal end portion 30 of the eyeglass retainer member 14 is sewn into the interior of the cap 12 as depicted in the drawings. A surgeon adjusts the tethers 16 and ties them together with a bow knot so as to adjust the cap 12 to fit his head and places the cap 12 on his head with the tethers 16 at the rear of his head and the distal end portion 32 of the eyeglass retainer member 14 extending downwardly along his nose. The surgeon then places eyeglasses 50 on his face so that a nose bridge 52 thereof rests at the top of his nose, over the distal end portion 32, and ear pieces 54 extend about his ears. When the surgeon has adjusted the eyeglasses 50 to a comfortable position, he loops the narrow distal end portion 32 of the eyeglass retainer member 14 upwardly about the nose bridge 52 and presses hooks 49 of the hook fastener material 48 against the fastening loops 46 of the top surface 34 of the proximal end portion 30 so that these fastening hooks and loops fasten to one another. In this configuration, the distal end portion 32 forms a loop 56, as is depicted in phantom in FIG. 1, enclosing the nose bridge 52 of the eyeglasses 50. This loop securely holds the eyeglasses in position on the surgeon's nose, not letting the nose bridge 52 slide down his nose.

It should be appreciated that the greater width of the proximal end portion provides a larger target for a surgeon attempting to fasten the fastening hooks 49 to the fastening loops 46. It must be remembered that this procedure is carried out by feel since the surgeon cannot see what he is doing. At the same time, the distal end portion can be separated from the proximal end portion by one hand, since the proximal end portion is held to a surgeon's head by the cap.

Also, a significant benefit of this invention is that the proximal end portion 30 is located at the interior surface 24 of the cap 12 so that its right, left and end edge portions 28a, b, and c are hidden and cannot be gripped by the surgeon. This is significant because when the surgeon tries to grip the distal end portion 32, which he can't see, he can easily recognize it by feeling its edges and cannot inadvertently grip hidden edge portions 28a, b and c of the proximal end portions.

Another advantage of the surgeon's headpiece of this invention is that the eyeglass retainer member 14 is sewn to the cap 12 rather than being adhered to it. In this respect, glue can become ineffective when it becomes soaked whereas stitches normally hold when wet. It is also otherwise less likely that a surgeon will pull the cap away from the eyeglass retainer member 14 if it is sewn thereto rather than being adhered thereto.

It is further significant that a base member 40 of the eyeglass retainer member 14 is constructed of a plastic foam core 42 which makes it quite soft to the touch and less irritating to a wearer. Similarly, it is important that the base member has soft fastening-loop material on opposite sides thereof which also causes little irritation to wearers. Also, an advantage of this invention is that the foam material absorbs moisture while the retainer member remains intact.

Although this invention is quite useful to surgeons and surgeons aides who wear eyeglasses, it is also useful for those who do not normally wear eyeglasses but can do so for protection of safety. In this regard, it is thought that some diseases are transmitted by patient body fluids splashing into eyes. Also, during laser surgery, it is often desirable for surgeons and their assistants to wear eyeglasses or safety glasses to protect eyes from any reflecting or misdirected laser beams. A misdirected laser beam may cause blindness if eyes are not properly protected with safety glasses.

While the invention has been particularly shown and described with reference to a preferred embodiment thereof, it will be understood by those skilled in the art tat various changes in form and detail may be made therein without departing from the spirit and scope of the invention. For example, in one embodiment, an additional thin piece of hook fastener material 56 is attached at the distal end of the distal end portion 32 to provide additional fastening strength. This additional piece of hook fastener material, as well as the hook fastener material 48, need not be padded by a plastic foam core and can be harder than the other material since they will not come into contact with a wearers skin. This additional piece 56 allows for additional flexibility in adjustment for wearers with larger heads.

It should be understood that as used herein the word "surgeon" includes not only surgeons but their assistants as well. Further, this word is sufficiently broad to include not only medical surgeons but anyone performing delicate and sensitive procedures in which it is difficult for him or her to control his or her eyeglasses but yet it is necessary that it be done.

Although a particular cap is depicted and described herein, it should be understood that there are many types of surgical caps and that this invention is not limited to a type of surgical cap or hood.

The embodiments of the invention in which an exclusive property or privilege are claimed or defined are as follows:

I claim:

1. A surgeon's headpiece comprising a cap for being placed on a surgeon's head for receiving the surgeon's head in an interior thereof, wherein:

said surgeon's headpiece further includes an elongated, flexible, eyeglass retainer member having a proximal end portion attached to a front portion of the cap and a distal end portion for extending below the cap, passing about a bridge of eyeglasses, doubling back on itself and fastening to itself;

said cap being slit at said front portion, said eyeglass retainer member being attached to said cap at opposite edges defining said slit in the interior of said cap so that a top side of said eyeglass retainer is exposed through the slit at an exterior of said cap;

whereby said distal end portion of said eyeglass retainer can be brought into contact with and fastened to the top surface of said eyeglass retainer member exposed through the slit.

2. A surgeon's headpiece as in claim 1 wherein said eyeglass retainer member has two widths, with a width of said proximal portion attached to said cap being substantially greater than a width of said distal end portion extending below said cap.

3. A surgeon's headpiece as in claim 2 wherein said eyeglass retainer member is constructed primarily of a foam core covered by soft loop fastener material.

4. A surgeon's headpiece as in claim 1 wherein the edges of said cap at said slit are doubled back into the interior of said cap and attached thereat to said eyeglass retainer.

5. A surgeon's headpiece as in claim 4 wherein said edges defining said slit are attached to said eyeglass retainer by sewn stitches.

6. A surgeon's headpiece as in claim 1 wherein said edges defining said slit are attached to said eyeglass retainer by sewn stitches.

7. A surgeon's headpiece as in claim 1 wherein said eyeglass retainer member is constructed primarily of a foam core material.

8. A surgeon's headpiece comprising a cap for being placed on a surgeon's head for receiving the surgeon's head in an interior thereof, wherein:

said surgeon's headpiece further includes an elongated, flexible, eyeglass retainer member having a proximal end portion attached to the interior of a front portion of said cap and a distal end portion for extending below the cap, passing about a bridge of eyeglasses, doubling back on said proximal end portion and attaching thereat exteriorly of said cap, said surgeon's headpiece including fastening elements exteriorly of said cap at said proximal end portion of said retainer member for attaching to the distal end portion;

wherein said eyeglass retainer member has two widths, with a width of the proximal portion attached to the interior of the cap being substantially greater than a width of most of the distal end portion extending below the cap with said distal end portion doubling back on the proximal end portion and being attached thereat exteriorly of said cap.

9. A surgeon's headpiece as in claim 8 wherein said eyeglass retainer member is constructed primarily of a foam core material.

10. A surgeon's headpiece as in claim 8 wherein said cap is attached to said eyeglass retainer by sewn stitches.

11. A surgeon's headpiece comprising a cap for being placed on a surgeon's head for receiving the surgeon's had in an interior thereof, wherein:

said surgeon's headpiece further includes an elongated, flexible eyeglass retainer member having a proximal end portion attached to the interior of a front portion of said cap and a distal end portion for extending below the cap, passing about a bridge of eyeglasses, doubling back on said proximal end and attaching thereat exteriorly of the cap, said surgeon's headpiece including fastening elements exteriorly of said cap at said proximal end portion of said retainer member for attaching to the distal end portion;

wherein said eyeglass retainer member is constructed primarily of foam having fastener material thereon with said distal end portion doubling back on the proximal end portion and being attached thereat exteriorly of said cap.

12. A surgeon's headpiece as in claim 11 wherein said cap is attached to said eyeglass retainer by sewn stitches.

* * * * *